United States Patent [19]
Nishida

[11] Patent Number: 5,698,924
[45] Date of Patent: Dec. 16, 1997

[54] ROTOR FOR DYNAMO-ELECTRIC MACHINE WITH IMPROVED COOLING DEVICE

[75] Inventor: Yukihiro Nishida, Tokyo, Japan

[73] Assignee: Mitsubishi Denki Kabushiki Kaisha, Tokyo, Japan

[21] Appl. No.: 558,981

[22] Filed: Nov. 16, 1995

[30] Foreign Application Priority Data

Jun. 9, 1995 [JP] Japan .................................. 7-143518

[51] Int. Cl.$^6$ ...................... H02K 1/32; H02K 3/36
[52] U.S. Cl. .................... 310/214; 310/59; 310/60 A; 310/61; 310/64
[58] Field of Search .................. 310/214, 64, 52, 310/58, 61, 65, 261, 60 R, 60 A, 59

[56] References Cited

U.S. PATENT DOCUMENTS

| | | | |
|---|---|---|---|
| 3,596,120 | 7/1971 | Potter | 310/65 |
| 3,781,581 | 12/1973 | Lehuen et al. | 310/215 |
| 4,013,908 | 3/1977 | Weghaupt | 310/61 |
| 4,152,610 | 5/1979 | Wallenstein | 310/59 |
| 4,365,177 | 12/1982 | Madsen | 310/61 |
| 4,748,354 | 5/1988 | Toshima | 310/60 A |

FOREIGN PATENT DOCUMENTS

| | | |
|---|---|---|
| 2410897 | 11/1978 | France . |
| 2850388 | 5/1979 | Germany . |
| 2011733 | 11/1978 | United Kingdom . |

*Primary Examiner*—Steven L. Stephan
*Assistant Examiner*—Tran N. Nguyen
*Attorney, Agent, or Firm*—Leydig, Voit & Mayer, Ltd.

[57] ABSTRACT

A rotor for a dynamo-electric machine has a V-shaped groove for providing a fast gas stream with an outward speed component in the radial direction, the V-shaped groove being provided on the upstream side of the fast gas stream at an opening of a wedge exhaust hole. The dynamo-electric machine also has a sloping surface which is inclined with respect to the radial direction so that the exhaust stream coming out of the wedge exhaust hole is led in the direction of the fast gas stream, the sloping surface being provided on the downstream side of the fast gas stream at the wedge exhaust hole. This structure permits a smaller angle of the mergence of the fast gas stream and the exhaust stream and it accordingly reduces the pressure loss in the coolant gas at the outlet of the wedge exhaust hole, thus achieving reduced loss in the fan power. The result is higher operating efficiency of the rotor.

14 Claims, 7 Drawing Sheets

ROTOR FOR DYNAMO-ELECTRIC MACHINE WITH IMPROVED COOLING DEVICE

BACKGROUND OF THE INVENTION

1. Field of the Invention

The present invention relates to a rotor for a dynamo-electric machine employed for a turbo-generator or the like and, more particularly, to an improvement in a ventilating cooling performance thereof.

2. Description of the Related Art

FIG. 13 is a cutaway perspective view illustrative of a slot section of a rotor of a conventional dynamo-electric machine which is similar to the one disclosed, for example, in Japanese Patent Laid-Open No. 4-351439. In FIG. 13, the outer periphery of a cylindrical rotor core 1 has tooth sections 1a and slots 2 which extend in the axial direction and which are provided alternately in the circumferential direction. A rotor coil 3 is inserted in each slot 2. The rotor coil 3 is insulated for each turn. Further, the rotor coil 3 is provided with an axial direction coolant passage 3a. Arrow A indicates the flow of a coolant gas in the axial direction coolant passage 3a.

A wedge 5 is inserted via an insulator (packing) 4 outside the rotor coil 3 in each slot 2. The wedge 5 fixes a linear section of the rotor coil 3 in the slot 2. Provided at a central part of the wedge 5 are a plurality of wedge exhaust holes 5a through which the coolant gas, which has circulated in the rotor coil 3, is exhausted. There is an insulating sheet 6 between the rotor coil 3 and the rotor core 1. The wedge 5 and the tooth section 1a serve to protect the rotor coil 3 from coming out of the slot 2 against the centrifugal force generated when the rotor rotates.

FIG. 14 is a cross-sectional view illustrative of an essential part of FIG. 13. The rotor coil 3 and the insulator 4 are provided with radial direction coolant passages 3b and 4a which lead the coolant gas to the wedge exhaust holes 5a.

The operation will now be described. When the rotor rotates at high speed, a fast gas stream (indicated by arrow B in FIG. 14), which moves counterclockwise along the outer peripheral surface thereof, is generated. The coolant gas, which has flowed through the axial direction coolant passage 3a to cool the rotor coil 3, runs through the radial direction coolant passages 3b and 4a before it is emitted out of the rotor through the wedge exhaust holes 5a as indicated by arrow C shown in FIG. 14. Arrows B and C of FIG. 14 indicate the fast gas stream and the coolant gas stream observed from a coordinate system which is fixed on the rotor. These gas streams B and C merge on the surface of the outer periphery of the rotor.

In the rotor of the conventional dynamo-electric machine which has the structure described above, fast gas stream B generated during fast revolution blocks the coolant gas stream C which is exhausted through the wedge exhaust holes 5a. This causes ventilation resistance at the outlets of the wedge exhaust holes 5a to increase about three times that obtained when the rotor is stationary. Therefore, a ventilating fan having a large differential pressure must be used to maintain the temperature of the rotor coil 3 at a fixed level or lower. The use of such a ventilating fan with a large differential pressure is inevitably accompanied by a larger power loss in the fan, presenting a problem of a low operating efficiency of the dynamo-electric machine.

SUMMARY OF THE INVENTION

The present invention has been achieved with a view toward solving the problem described above, and it is an object of the present invention to provide a rotor for a dynamo-electric machine which is capable of decreasing the pressure drop in a coolant gas at the outlet of a wedge exhaust hole, thereby improving the performance of cooling a rotor coil and also decreasing the loss in fan power for moving the coolant gas so as to improve the operating efficiency of the rotor.

To this end, according to one aspect of the present invention, there is provided a rotor for a dynamo-electric machine, comprising: a cylindrical rotor core having a slot on the outer periphery thereof, the slot extending in the axial direction; a rotor coil disposed in the slot, the rotor coil having a coolant passage for allowing a coolant gas to flow through; and a wedge disposed in the outer periphery of the rotor coil in the slot for fixing the rotor coil in the slot, the wedge having a wedge exhaust hole extending in the radial direction of the rotor core and communicating with the coolant passage; wherein a V-shaped groove for providing a fast gas stream, which is generated along the outer periphery surface by revolution, with an outward speed component in the radial direction is provided on the upstream side of the fast gas stream at the opening of the wedge exhaust hole; and a sloping surface, which is inclined with respect to the radial direction so that an exhaust stream from the wedge exhaust hole is led in the direction of the fast gas stream, is provided on the downstream side of the fast gas stream at the wedge exhaust hole.

According to another aspect of the present invention, there is provided a rotor for a dynamo-electric machine, comprising: a cylindrical rotor core having a slot on the outer periphery thereof, the slot extending in the axial direction; a rotor coil disposed in the slot, the rotor coil having a coolant passage for allowing a coolant gas to flow through; and a wedge disposed in the outer periphery of the rotor coil in the slot for fixing the rotor coil in the slot, the wedge having a wedge exhaust hole extending in the radial direction of the rotor core and communicating with the coolant passage; wherein a projecting section for providing a fast gas stream, which is generated along the outer periphery surface by revolution, with an outward speed component in the radial direction is provided on the upstream side of the fast gas stream at the opening of the wedge exhaust hole; and a sloping surface, which is inclined with respect to the radial direction so that an exhaust stream from the wedge exhaust hole is led in the direction of the fast gas stream, is provided on the downstream side of the fast gas stream at the wedge exhaust hole.

BRIEF DESCRIPTION OF THE DRAWINGS

11 is a cross-sectional view illustrative of a coolant gas exhaust section of a rotor of a dynamo-electric machine according to a sixth embodiment of the present invention.

DETAILED DESCRIPTION OF THE PREFERRED EMBODIMENTS

The embodiments according to the present invention will now be described with reference to the accompanying drawings.

First Embodiment

Figure 1:
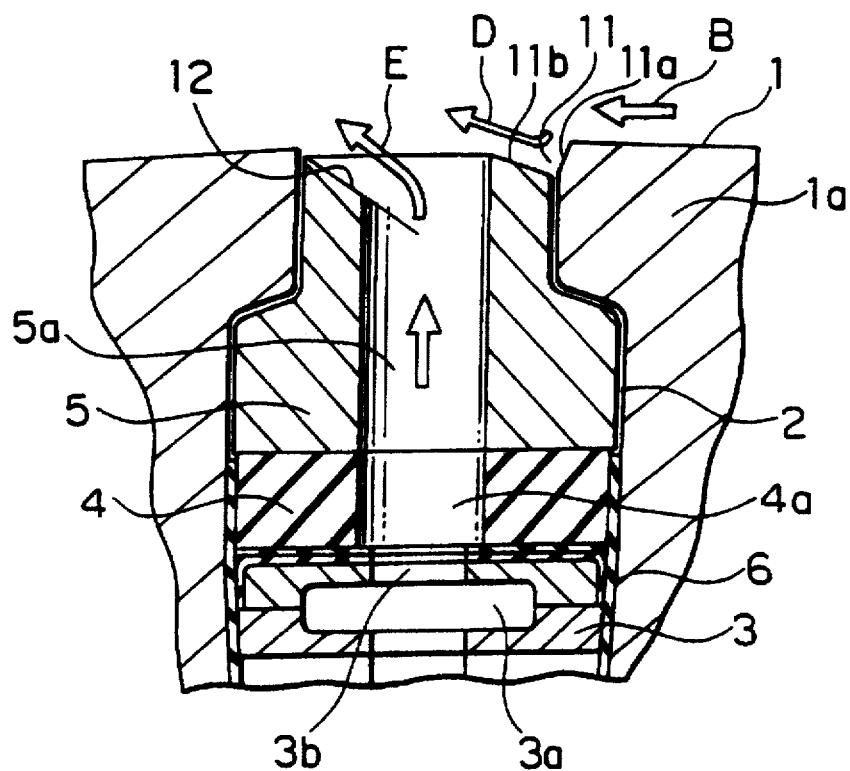
FIG. 1 is a cross-sectional view illustrative of a coolant gas exhaust section of a rotor of a dynamo-electric machine according to a first embodiment of the present invention.
Figure 2:
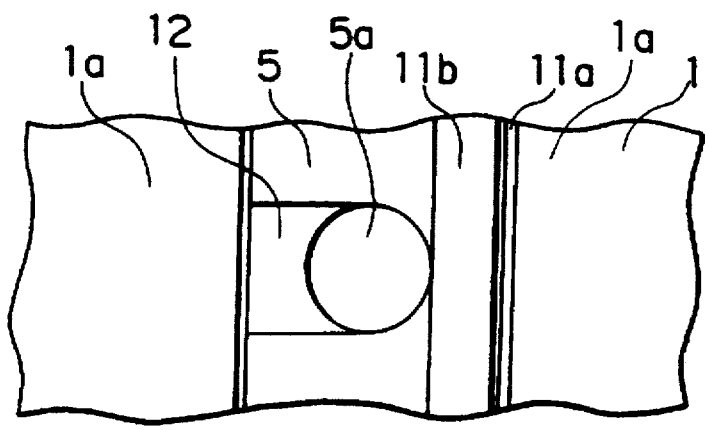
FIG. 2 is a plan view of FIG. 1.
Figure 13:
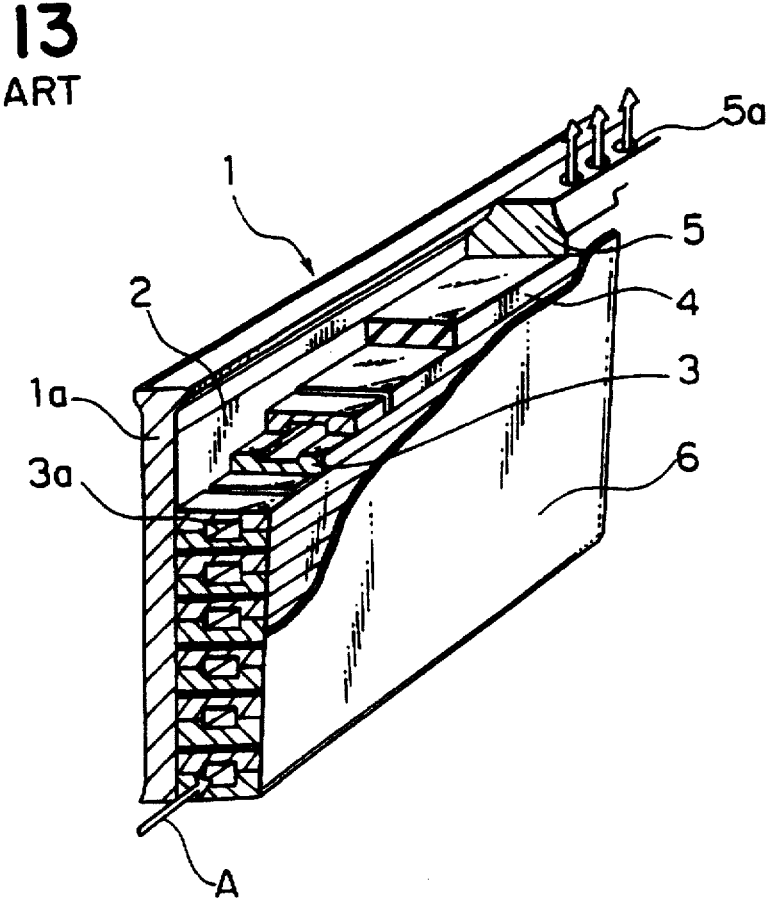
FIG. 13 is a cutaway perspective view illustrative of a slot section of a rotor of a conventional dynamo-electric machine.
Figure 14:
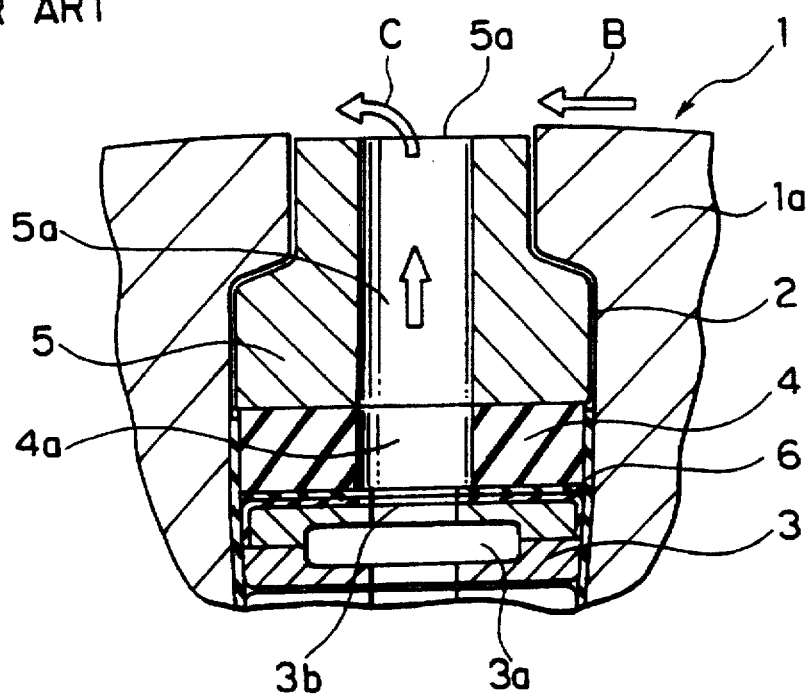
FIG. 14 is a cross-sectional view illustrative of the essential section of FIG. 13.

FIG. 1 is the cross-sectional view illustrative of the coolant gas exhaust section of the rotor of the dynamo-electric machine according to the first embodiment of the present invention; and FIG. 2 is a plan view of FIG. 1. The parts which are the same as or corresponding to those shown in FIG. 13 or FIG. 14 will be given the same reference numerals and the description thereof will be omitted.

Fast revolution of the rotor generates a East gas stream which runs along the outer periphery surface of the rotor. Provided on the upstream side of the fast gas stream at the opening of the wedge exhaust hole 5a is a V-shaped groove 11 which has a V-shaped cross section and which extends in the direction of the axis of the rotor. The V-shaped groove 11 is constructed by chamfers 11a and 11b provided on the tooth section 1a and the wedge 5, respectively. Provided on the downstream side of the fast gas stream at the wedge exhaust hole 5a is a sloping surface (notched surface) 12 which is inclined with respect to the radial direction of the rotor. In such a rotor, the fast gas stream flowing as indicated by arrow B has an outward component in the radial direction because of the V-shaped groove 11 and it flows as indicated by arrow D at the opening of the wedge exhaust hole 5a. A predetermined amount of the coolant gas, which is exhausted through the wedge exhaust hole 5a, is allowed to flow at all times by the pumping effect of the rotor; the provision of the sloping surface causes the flow of the coolant gas to curve nearly in parallel to the sloping surface 12 as shown by arrow E, permitting smoother flow.

Thus, the angle of mergence of the fast gas stream and the exhaust stream becomes smaller, resulting in a considerably lower ventilation resistance at the outlet of the wedge exhaust hole 5a than in known devices. An analysis has revealed that the ventilation resistance is reduced to approximately one third of that obtained with the conventional configuration. As a result, the pressure loss in the coolant gas at the outlet of the wedge exhaust hole 5a decreases and the ventilating amount of the coolant gas, which cools the rotor coil 3, increases. This makes it possible to further lower the temperature of the rotor coil 3 while electric currents are being supplied to the rotor coil and also to reduce the loss in the fan power, leading to higher operating efficiency of the rotor.

Second Embodiment

Figure 3:
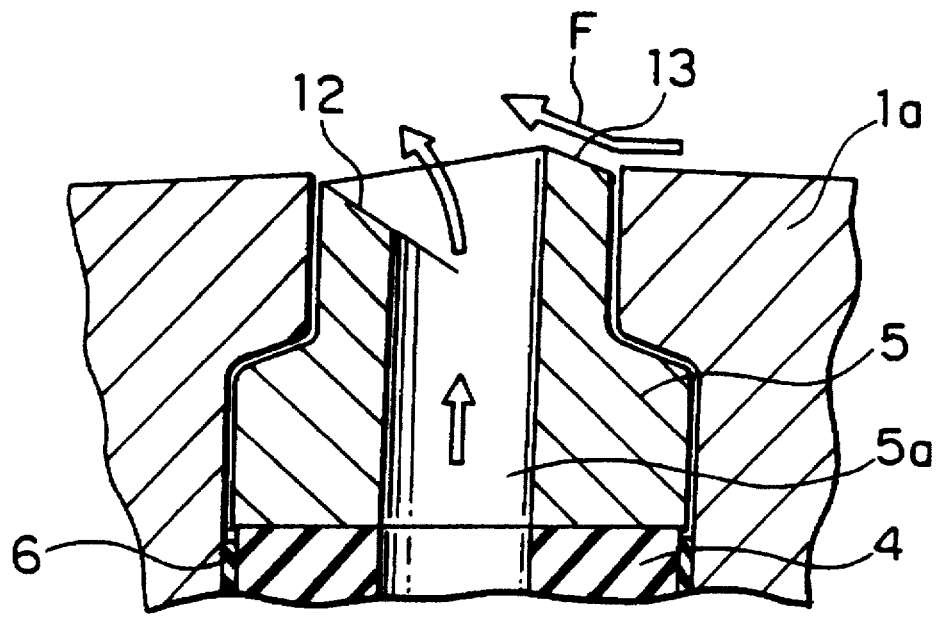
FIG. 3 is a cross-sectional view illustrative of a coolant gas exhaust section of a rotor of a dynamo-electric machine according to a second embodiment of the present invention.
Figure 4:
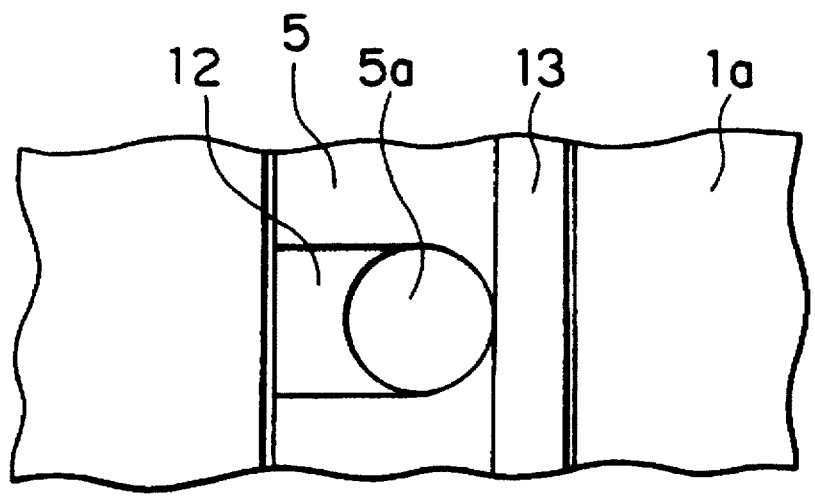
FIG. 4 is a plan view of FIG. 3.

In the first embodiment described above, the V-shaped groove 11 was shown as the means for providing the fast gas stream with the radial component. As an alternative, however, a an inclined plan section 13, which projects in the radial direction beyond the outer peripheral surface of the tooth section 1a, may be provided on the outer peripheral surface of the wedge 5 on the upstream side of the fast gas stream from the wedge exhaust hole 5a. This ensures that the fast gas stream is provided with the radial component more securely, so that it moves as indicated by arrow F to provide the similar effect to that obtained in the first embodiment as shown in FIG. 3 and FIG. 4. The second embodiment eliminates the need of chamfering the tooth section 1a; therefore, the machining time for the tooth sections 1a can be shortened.

Third Embodiment

Figure 5:
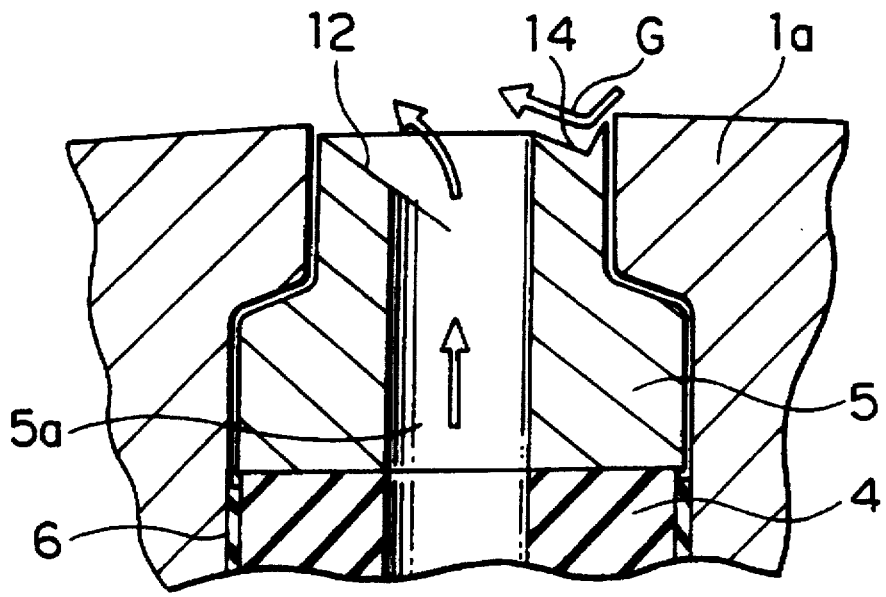
FIG. 5 is a cross-sectional view illustrative of a coolant gas exhaust section of a rotor of a dynamo-electric machine according to a third embodiment of the present invention.
Figure 6:
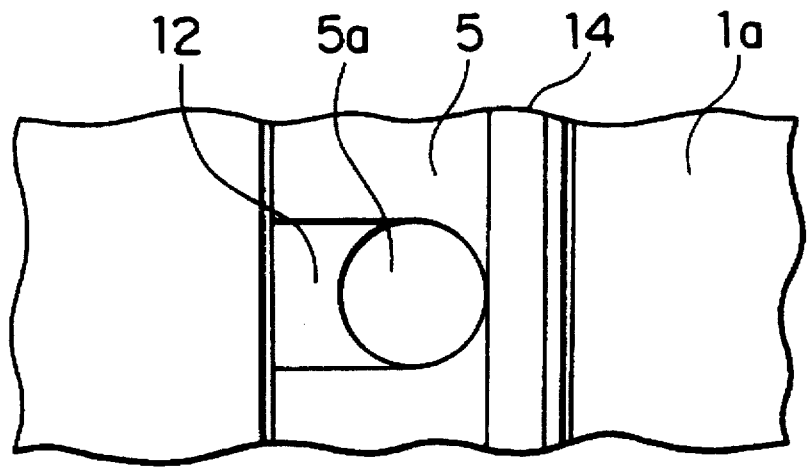
FIG. 6 is a plan view of FIG. 5.

FIG. 5 and FIG. 6 show the third embodiment in accordance with the present invention. In the third embodiment, the V-shaped groove 14 is formed only in the outer peripheral surface of the wedge 5. The V-shaped groove 14 provides the fast gas stream with the outward component in the radial direction as shown by arrow G. In the second embodiment wherein the projecting section 13 juts out, if the rotor is rotated with the drum section thereof supported during the assembly of the rotor, the contents of the rotor below the wedge 5 may be damaged under the load of the rotor, thus requiring especially careful handling of the rotor. In the third embodiment, however, the rotor may be handled in the same manner as the conventional example during the assembly process since it has no projecting section. Furthermore, the chamfering of the tooth sections 1a may be omitted as in the case of the second embodiment, permitting a shortened machining time required for the tooth sections 1a.

Fourth Embodiment

Figure 7:
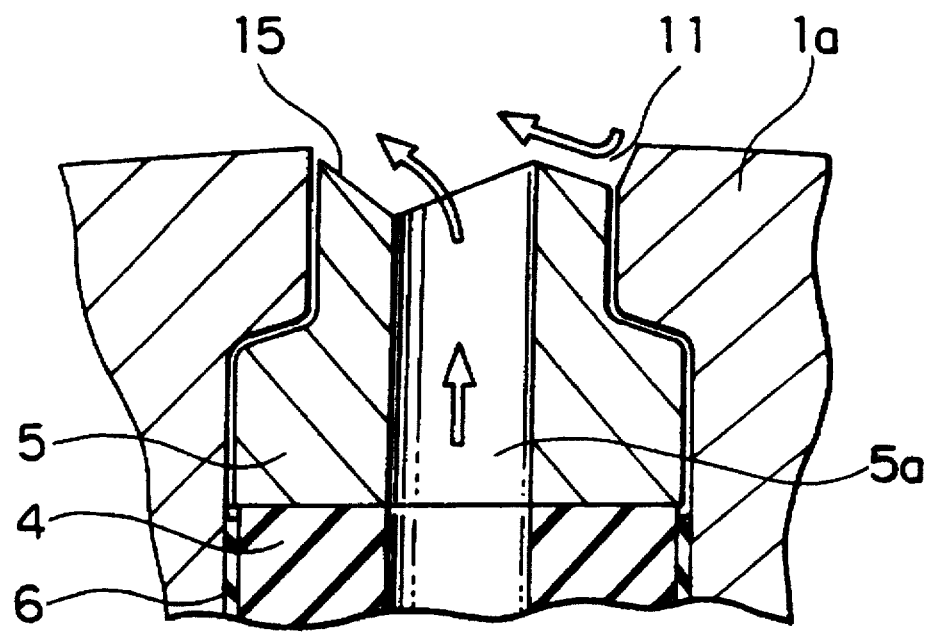
FIG. 7 is a cross-sectional view illustrative of a coolant gas exhaust section of a rotor of a dynamo-electric machine according to a fourth embodiment of the present invention.
Figure 8:
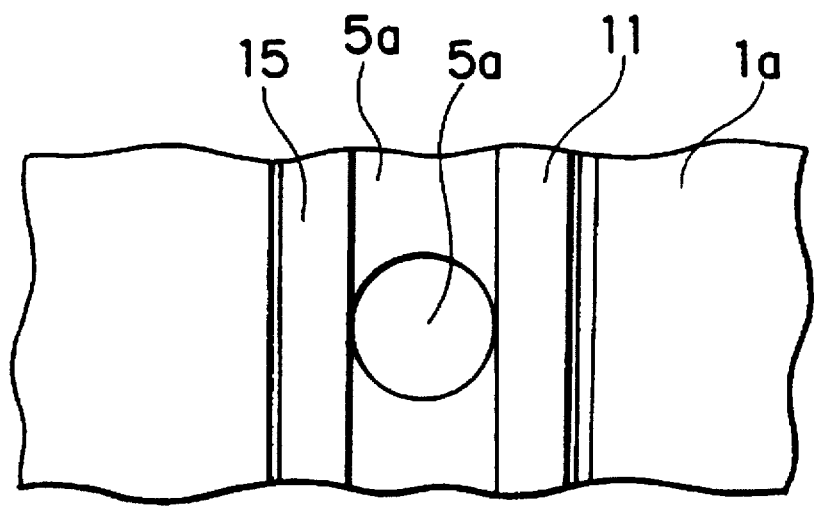
FIG. 8 is a plan view of FIG. 7

FIG. 7 and FIG. 8 illustrate the fourth embodiment in accordance with the present invention. In the fourth embodiment, the outer peripheral surface of the wedge 5 is notched to have the V-shaped cross section, thereby forming a sloping surface 15. In the first to third embodiments described above, the slant surface 12 is formed for each wedge exhaust hole 5a. In the fourth embodiment, the sloping surface 15 for all wedge exhaust holes 5a can be formed in a single notching step when the plurality of the wedge exhaust holes 5a are arranged in the axial direction, thus permitting a simpler manufacturing process. The sloping surface 15 in the fourth embodiment may be combined with the second or third embodiment stated above.

Fifth Embodiment

Figure 9:
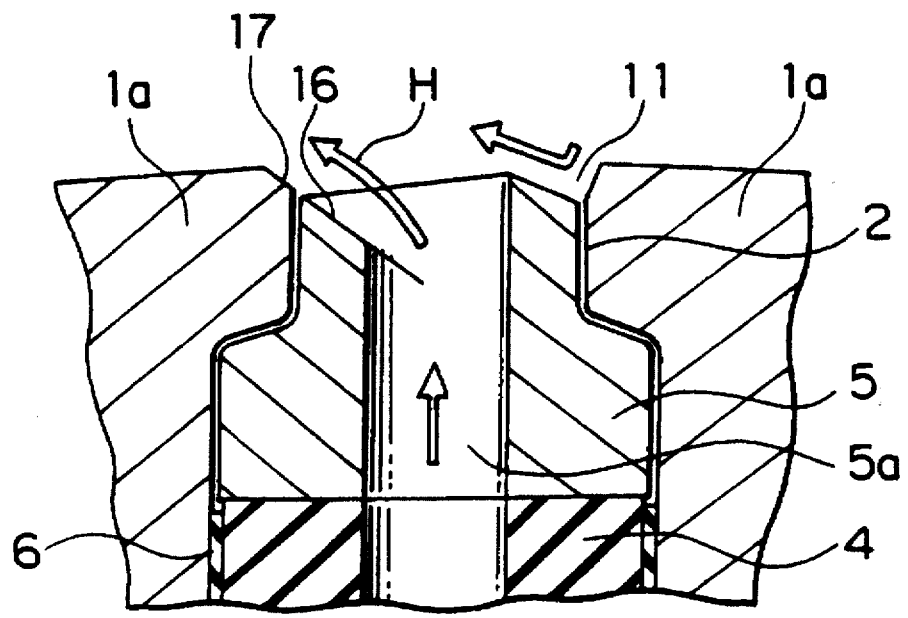
FIG. 9 is a cross-sectional view illustrative of a coolant gas exhaust section of a rotor of a dynamo-electric machine according to a fifth embodiment of the present invention.
Figure 10:
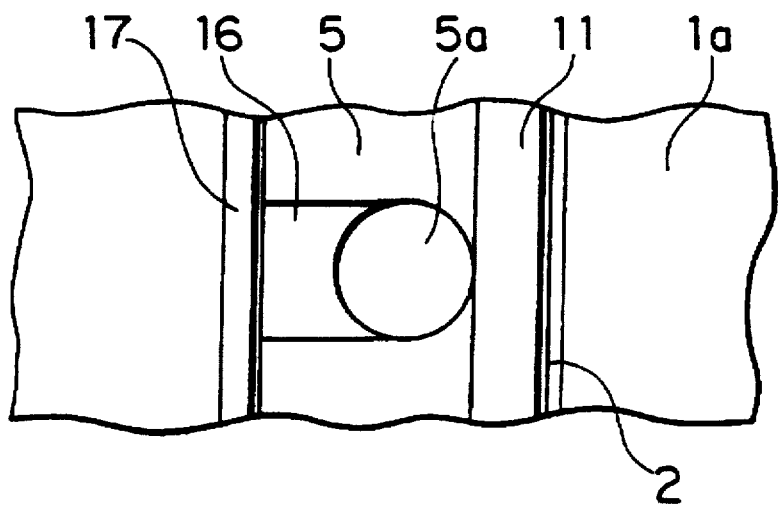
FIG. 10 is a plan view of FIG. 9; FIG.

Furthermore, FIG. 9 and FIG. 10 show the fifth embodiment in accordance with the present invention. In the fifth embodiment, the end section on the outer peripheral side of the wall of the slot 2, i.e., the corner of the tooth section 1a, is provided with a chamfer 17 which continues to a sloping surface 16. These sloping surface 16 and the chamfer 17 cause the coolant gas to be exhausted as shown by arrow H. This structure permits a further smaller angle of the mergence of the East gas stream and the coolant gas exhaust stream and a larger opening area of the wedge exhaust hole 5a, thus achieving further reduction in the pressure loss in the coolant gas at the outlet of the wedge exhaust hole 5a. The fifth embodiment can be combined with the second or third embodiment described above.

Sixth Embodiment

Figure 11:
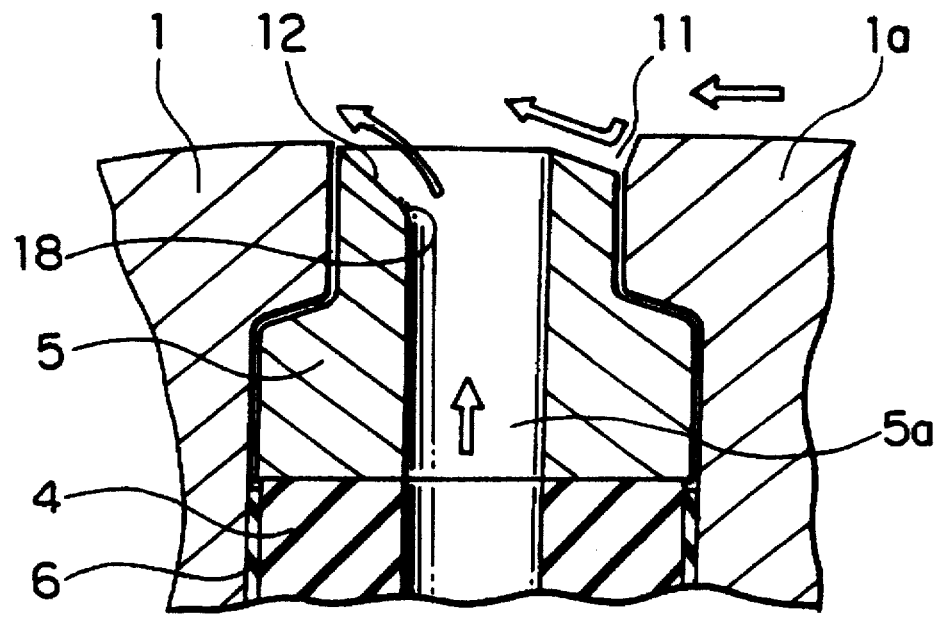
Figure 12:
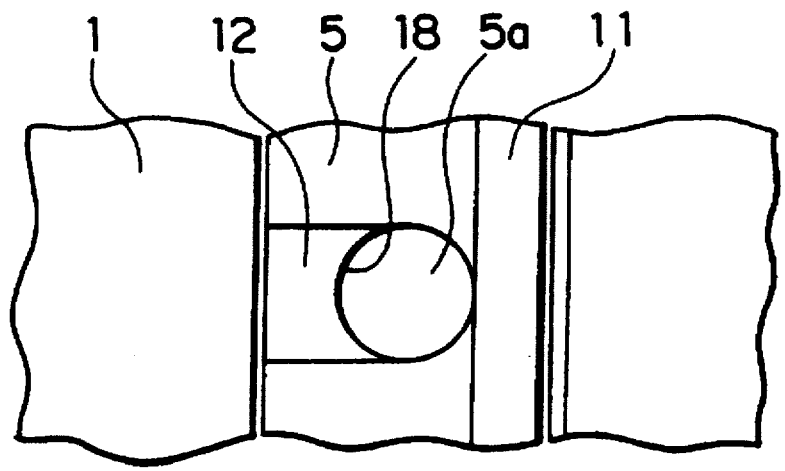
FIG. 12 is a plan view of FIG. 11.

FIG. 11 and FIG. 12 show the sixth embodiment in accordance with the present invention. In the sixth embodiment, an edge 18 located between the inner wall surface of the wedge exhaust hole 5a extending in the radial direction of the rotor core 1 and the sloping surface 12 has a cross section shaped in a smooth circular arc. This structure permits smooth change of the angle of the coolant gas exhaust stream, making it possible to accomplish a lower resistance of the mergence of the fast gas stream and the coolant gas exhaust stream than that obtained in the first embodiment. The sixth embodiment can be combined with the second to the fifth embodiments stated above.

The shape of the cross section of the V-shaped groove can be changed; the bottom thereof may be shaped into a circular arc to a certain extent as long as it is capable of providing the fast gas stream with a radial component.

What is claimed is:

1. A rotor for a dynamo-electric machine, comprising:

a cylindrical rotor core having a rotational axis and a slot formed in an outer periphery of the rotor core and extending in an axial direction of the rotor core, the rotor core generating a fast gas stream along its outer periphery when rotated about its axis;

a rotor coil disposed in the slot and having a coolant passage for a coolant gas formed therein;

a wedge disposed in the slot on a radially outer side of the rotor coil for fixing the rotor coil in the slot, the wedge having a wedge exhaust conduit extending outwardly with respect to the axis of the rotor core and communicating with the coolant passage, the wedge including a sloping surface which is inclined with respect to a radial direction of the rotor core so that an exhaust stream from the wedge exhaust conduit is led in the direction of the fast gas stream, the sloping surface being provided on a downstream side of the wedge exhaust conduit with respect to the fast gas stream near an outer end of the wedge exhaust conduit; and a V-shaped groove formed in an outer periphery of the rotor in a vicinity of the outer end of the wedge exhaust conduit on an upstream side of the wedge exhaust conduit with respect to the fast gas stream for imparting a velocity component to the fast gas stream in a radially outward direction of the rotor core.

2. A rotor for a dynamo-electric machine according to claim 1, wherein the V-shaped groove is formed entirely in an outer peripheral surface of the wedge.

3. A rotor for a dynamo-electric machine according to claim 1, wherein the wedge is provided with a plurality of wedge exhaust conduits spaced from each other in the axial direction and the sloping surface is formed by notching the outer peripheral surface of the wedge to span a plurality of the wedge exhaust conduits and produce a V-shaped cross section.

4. A rotor for a dynamo-electric machine according to claim 1, wherein a wall of the slot of the rotor core is provided with a chamfer aligned with the sloping surface.

5. A rotor for a dynamo-electric machine according to claim 1, wherein an edge between an inner wall surface of the wedge exhaust conduit and the sloping surface has an arcuate cross section.

6. A rotor for a dynamo-electric machine, comprising:

a cylindrical rotor core having a rotational axis and a slot formed in an outer periphery of the rotor core and extending in an axial direction of the rotor core, the rotor core generating a fast gas stream along its outer periphery when rotated about its axis;

a rotor coil disposed in the slot and having a coolant passage for coolant gas formed therein; and a wedge disposed in the slot of a radially outer side of the rotor coil for fixing the rotor coil in the slot, the wedge having a wedge exhaust conduit extending outwardly with respect to the axis of the rotor core and communicating with the coolant passage, the wedge including a projecting section formed on an upstream side of the wedge exhaust conduit with respect to the fast gas stream for imparting a velocity component to the fast gas stream in a radially outward direction of the rotor core, and a sloping surface provided on a downstream side of the wedge exhaust conduit with respect to the fast gas stream and sloping outwardly with respect to the axis of the rotor core from the wedge exhaust conduit towards the downstream side of the wedge exhaust conduit and being inclined with respect to the radial direction of the rotor core so that an exhaust stream from the wedge exhaust conduit is led in the direction of the fast gas stream.

7. A rotor for a dynamo-electric machine according to claim 6, wherein the wedge is provided with a plurality of wedge exhaust conduits spaced from each other in the axial direction of the rotor core and the sloping surface is formed by notching the outer peripheral surface of the wedge to span a plurality of the wedge exhaust conduits to produce a V-shaped cross section.

8. A rotor for a dynamo-electric machine according to claim 6, wherein a wall of the slot of the rotor core is provided with a chamfer aligned with the sloping surface.

9. A rotor for a dynamo-electric machine according to claim 6, wherein an edge between an inner wall surface of the wedge exhaust conduit extending in the radial direction of the rotor core and the sloping surface has an arcuate cross section.

10. A rotor for a dynamo-electric machine according to claim 1, wherein the V-shaped groove includes a first chamfered surface of the wedge and a second chamfered surface of the cylindrical rotor core.

11. A rotor for a dynamo-electric machine according to claim 1, wherein the wedge exhaust conduit is aligned with a radius of the rotor core.

12. A rotor for a dynamo-electric machine according to claim 1, wherein the sloping surface is recessed with respect to an outer surface of the wedge.

13. A rotor for a dynamo-electric machine according to claim 6, wherein the wedge exhaust conduit is aligned with a radius of the rotor core.

14. A rotor for a dynamo-electric machine according to claim 6, wherein the sloping surface is recessed with respect to an outer surface of the wedge.

* * * * *

UNITED STATES PATENT AND TRADEMARK OFFICE
CERTIFICATE OF CORRECTION

PATENT NO.   : 5,698,924
DATED        : December 16, 1997
INVENTOR(S)  : Nishida It is certified that error appears in the above-identified patent and that said Letters Patent is hereby corrected as shown below:   On the title page, Item 56, Foreign Patent Documents, Insert the following:

-- 4351439   12/1992   Japan --;

Column 6, Line 3, change "of" to --on--.

Signed and Sealed this

Eighteenth Day of August, 1998

Attest:

BRUCE LEHMAN

Attesting Officer    Commissioner of Patents and Trademarks